United States Patent

[11] 3,564,285

[72] Inventor Edward O. Gilbert
Ann Arbor, Mich.
[21] Appl. No. 726,962
[22] Filed May 6, 1968
[45] Patented Feb. 16, 1971
[73] Assignee Reliance Electric Company
Cleveland, Ohio
a corporation of Delaware

[54] ELECTRONIC COMPARATOR CIRCUIT

6 Claims, 7 Drawing Figs.

[52] U.S. Cl. .................... 307/234, 328/112, 328/162; 307/235
[51] Int. Cl. .................... H03k 5/20
[50] Field of Search .................... 307/234; 328/140, 118

[56] References Cited

UNITED STATES PATENTS

| | | | |
|---|---|---|---|
| 3,277,311 | 10/1966 | Merlen et al. | 307/234 |
| 3,278,685 | 10/1966 | Harper | 307/234 |
| 3,317,745 | 5/1967 | Scharf | 307/234 |
| 3,413,412 | 11/1968 | Townsend | 307/234 |
| 3,461,390 | 8/1969 | Mack | 328/118 |
| 3,331,026 | 7/1967 | Parker | 328/150 |

*Primary Examiner*—Donald D. Forrer
*Assistant Examiner*—Harold A. Dixson
*Attorney*—Richard G. Stephens

ABSTRACT: A noise-rejecting analogue computer comparison circuit in which logic output signals of a high-speed comparator which responds to narrow noise spikes is applied directly and in inverted form to a pair of unidirectionally-acting delay circuits, each of which respond only to pulses of a predetermined time-width or greater, but which reset substantially instantaneously, with the outputs of the delay circuits applied to a set-clear flip-flop to provide a logic output signal. Lead networks inserted in the comparator input circuits compensate for the delay provided by the delay circuits, to provide a noise-rejecting comparator which has very little delay for smoothly-varying input signals.

INVENTOR.
EDWARD O. GILBERT

BY Richard D. Stephens

ATTORNEY

INVENTOR.
EDWARD O. GILBERT
BY Richard G. Stephens
ATTORNEY

ELECTRONIC COMPARATOR CIRCUIT

A wide variety of electronic computer, automatic control and instrumentation applications require or desirably include electronic comparator circuits. The function of an analogue electronic comparator circuit is to compare either a single continuous or smoothly varying-input voltage or current signal or the sum of a plurality of such signals with a reference level, such as zero, to provide for example, a first level or logic "0" output signal whenever the resultant input signal or signal sum is less than zero, and to provide a markedly different level logic "1" output signal whenever the resultant input signal is greater than zero. In most applications it is very important that the comparator output signal change exactly at a desired known comparison point, that the comparator output signal change as soon as the comparison point is crossed, with minimum time delay, and further, that the two output levels of the comparator be markedly different signal levels. If comparator output is plotted against either a single input or the sum of two or more comparator inputs, the output of a theoretically ideal comparator is a vertical line at the comparison point.

While an ideal comparator handling ideal smoothly varying or continuous analogue input signals would have a perfectly vertical characteristic, the signals applied to any practical comparator invariably are accompanied by some noise, and any actual input signal sum intended to represent zero will carry some noise components, so that a theoretically ideal comparator might switch randomly back and forth when such an input signal sum is applied to it. In a practical comparator it is highly desirable that one be able to establish a comparator deadband or hysteresis gap of known and controllable width, in order that the comparator may be made insensitive to noise signals below a selected magnitude and/or time duration. The obvious technique of inserting a low-pass filter in each input circuit of a comparator can make a comparator insensitive to many noise spikes, but such a technique is wholly unsatisfactory for many applications, as it not only delays response of the comparator to smoothly-varying input signals, but also integrates noise signals and combines them with the smoothly-varying information signals. A practical comparator may be arranged with a 20 millivolt deadband, to switch from logic O to logic 1 when the input signal sum increases above plus 10 millivolts, and to switch from logic 1 to logic 0 when the input signal sum decreases below minus 10 millivolts. While the provision of such a deadband tends to make the comparator less sensitive to noise spikes, it will be seen to result in delayed or offset comparator response at low input signal frequencies even in the absence of noise, and hence in some computation error. The requirement that the comparator switch at a well-defined comparison point will be seen to be inconsistent with the provision of a deadband or hysteresis gap. It has been generally regarded necessary in the prior art to arrange comparator deadbands to be a very small fraction (e.g. 0.02 percent) of computer fall-scale voltage, even though the use of such a narrow deadband makes such a comparator susceptible to noise spikes of even fairly low amplitudes. The comparator shown in my prior U.S. Pat. No. 3,353,033 closely approaches the operation of an ideal comparator. Embodiments of that prior invention have been constructed to operate with a well-defined drift-free hysteresis gap or deadband of the order of 20 millivolts, with a sensitivity of less than 10 millivolts, and with a speed of the order of 300 nanoseconds. With such characteristics, such a comparator will respond to noise spikes of extremely short duration. The mentioned comparator is fast enough and sensitive enough to respond, for example to a 50 millivolt triangular spike of no more than one microsecond in duration. In various applications, and especially many applications involving interconnected analogue and digital circuits, narrow spikes of such short duration result from various equipment imperfections, such as limitations in the operation of electronic switches, rather than from computation, and it would be desirable in such applications that a comparator ignore such narrow noise spikes and respond only to smoothly varying input signals. It is still important, however, that the comparator respond rapidly to smoothly varying analogue information input signals, even when such input signals have substantial rates of change, i.e. reasonably high frequency components.

Thus it is a primary object of the present invention to provide an improved electronic comparator which operates with high speed on smoothly varying input signals but which is immune to, or tends to be nonresponsive to noise spikes.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which.

FIGS. 3*a*, 3*b* and 3*c* to 3*e* are plots of waveforms useful in understanding the operation of the invention.

Figure 3A:
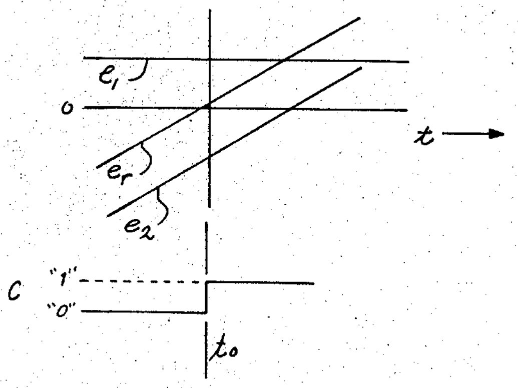
Figure 3B:
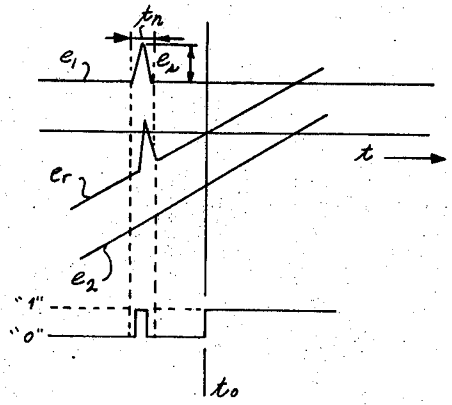

FIG. 3*a* illustrates two noise-free voltages $e_1$ and $e_2$ plotted against time t. If two such voltages are applied as inputs to a theoretical ideal comparator, the logic output signal C will change from logic 0 to logic 1 at times $t_0$ as shown in FIG. 3*a*, when the sign of the sum $e_r$ of the two voltages changes with respect to a reference level, shown as zero volts. FIG. 3*b* illustrates the same two voltages $e_1$ and $e_2$, but with a triangular noise spike of amplitude $e_s$ and time duration $t_n$ assumed to be added to input voltage $e_1$. Upon receiving such input signals, the theoretical or ideal comparator will be seen to respond to the noise spike, so that a false logic 1 output pulse will occur during a portion of the $t_n$ period, and then the comparator will respond again properly at time $t_0$. The false logic output occurring during the time $t_n$ period can cause a large variety of computation errors. Similar errors can occur, of course, when the sum of the applied signals is negative-going, and noise spikes themselves may be negative as well as positive-going, of course.

Figure 2:
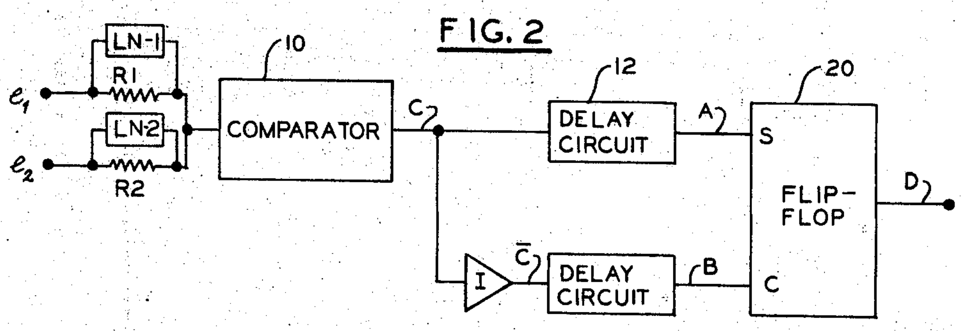
FIG. 2 is a block diagram of the improved comparator circuit.

In the block diagram of the invention shown in FIG. 2 two input signals $e_1$ and $e_2$ are shown being applied to a comparator 10 which is assumed to be a high speed comparator having an extremely narrow deadband and characteristics approaching those of an ideal comparator. Comparator 10 may comprise, for example, the comparator circuit shown in my prior U.S. Pat. No. 3,353,033, or one of a number of other comparators having fast response and very little hysteresis or deadband. The logic signal C from comparator 10 is applied directly to unidirectional delay circuit 12, and via a conventional logic inverter I to unidirectional delay circuit 14. The logic output signals A and B from delay circuits 12 and 14 are applied to opposite input lines, i.e. the "set" and "clear" lines, respectively, of a bistable circuit 20 assumed to be a set-clear flip-flop. Each of the delay circuits may be characterized as being unidirectional, since each responds to a 0 to 1 input signal transition with a predetermined time delay T, but each responds to an opposite, or 1 to 0 input signal transition without appreciable time delay.

Figure 3C:
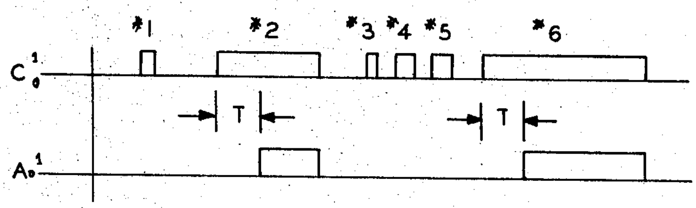

The operation of unidirectional delay circuit 12 is illustrated in FIG. 3*c*. Delay circuit 12 provides an output signal transition from 0 to 1 on line A T seconds after the input signal on line C changes from 0 to 1, if, and only if, the logic 1 signal on line C exists as long as T seconds. In a typical embodiment of the invention delay period T will lie within a range of 2—10 microseconds, and usually be about 4 or 5 microseconds, as voltage spikes having a duration less than 2 or so microseconds which are encountered by analogue comparators almost invariably result from noise or imperfections in electronic switches rather than from computation. Input pulses 01, 03, 04 and 05 on input line C are all shown shorter in time duration than the delay period T of delay circuit 12, and hence none of those input pulses causes an output signal transition on line A. Input pulses 02 and 06 both exist in the logic 1 state for time periods greater than T seconds, and an output transition on line A will be seen to occur T seconds after the leading edges of pulses 02 and 06. However, upon reset of pulses 02 and 06 to logic 0, delay circuit 12 will be seen to reset immediately, so that the trailing edges of the output pulses on line A coincide with the trailing edges of input pulses 02 and 06. Delay circuit 14 operates identically to circuit 12, but responds to inverted logic signals on line $\overline{C}$.

Figure 3D:
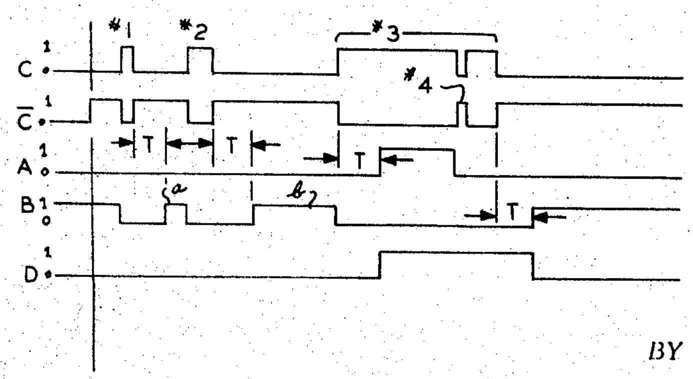

The operation of the overall circuit of FIG. 2 becomes evident from consideration of FIG. 3*d*. Prior to and at time *t*do the steady-state sum of input signals $e_1$ and $e_2$ is assumed to be negative, so that signal C from comparator 10 is 0, and inverted signal $\overline{C}$ is 1. With C and $\overline{C}$ equal to 0 and 1, respectively, the output signals A and B from delay circuits 12 and 14 are also 0 and 1, respectively, so that flip-flop 20 is cleared and its output on line D is 0. Now assume that noise pulses accompanying signal $e_1$ or $e_2$ or both provide output pulses on line C of the type shown as pulses 01 and 02. Since both pulses 01 and 02 are shorter in duration than the delay time T of delay circuit 12, neither of these two pulses causes any change in signal A. The leading edge of pulse 01 causes $\overline{C}$ and B to go to zero. The trailing edge of pulse 01 causes C to go to 1, which causes output signal B from delay circuit 14 to go to 1 after the delay period T of circuit 14. Signal B remains at the logic 1 level until the leading edge of pulse 02, when the fall of $\overline{C}$ causes B to go low. The logic 1 pulse (labeled "*a*" in FIG. 3*d*) on line B is applied to the clear line of flip-flop 20, but it causes no change in signal D since the flip-flop was previously cleared. The trailing edge of pulse 02 also results in a further "clear" pulse "*b*" being applied to flip-flop 20, after a time delay of T seconds, again with no effect upon the D output signal.

Now, upon the provision of a wider pulse of substantial duration from comparator 10, shown as pulse 03 in FIG. 3*d*, the A signal from delay circuit 12 will be seen to go high, T seconds after the leading edge of pulse 03, thereby setting flip-flop 20 and providing a logic 1 output signal D. A brief noise spike is assumed to switch the comparator 10 during the pulse 03 period, as indicated by pulse 04 of the $\overline{C}$ signal. However, pulse 04 is too short in duration to apply a clear signal on line B to flip-flop 20. However, a clear signal will be seen to occur on line B at a time T seconds after the trailing edge of pulse 03, thereby causing flip-flop 20 to be cleared and causing the D signal to return to logic 0 level. Thus it will be seen that the circuit of FIG. 2 operates to reject the brief noise pulses (01, 02, 04 in FIG. 3*d*) and to respond only to the comparator output pulse (03) of substantial duration.

While the leading and trailing edges of pulse 03 occur substantially exactly at the times when the sum of the input signals $e_1$ and $e_2$ to the comparator changes sign, it will be seen from FIG. 3*d* that the leading and trailing edges of the output pulse on line D each occur with a time delay of T second after such input signal transitions. While the effects of such time delays can be compensated for by further computation in some applications, most applications desirably include comparator output signals which change state exactly at or nearly at the times when the sum of the input signals changes sign rather than at some later time even though the amount of the delay is predetermined and can be compensated for by further calculation.

Figures 1, 3E:
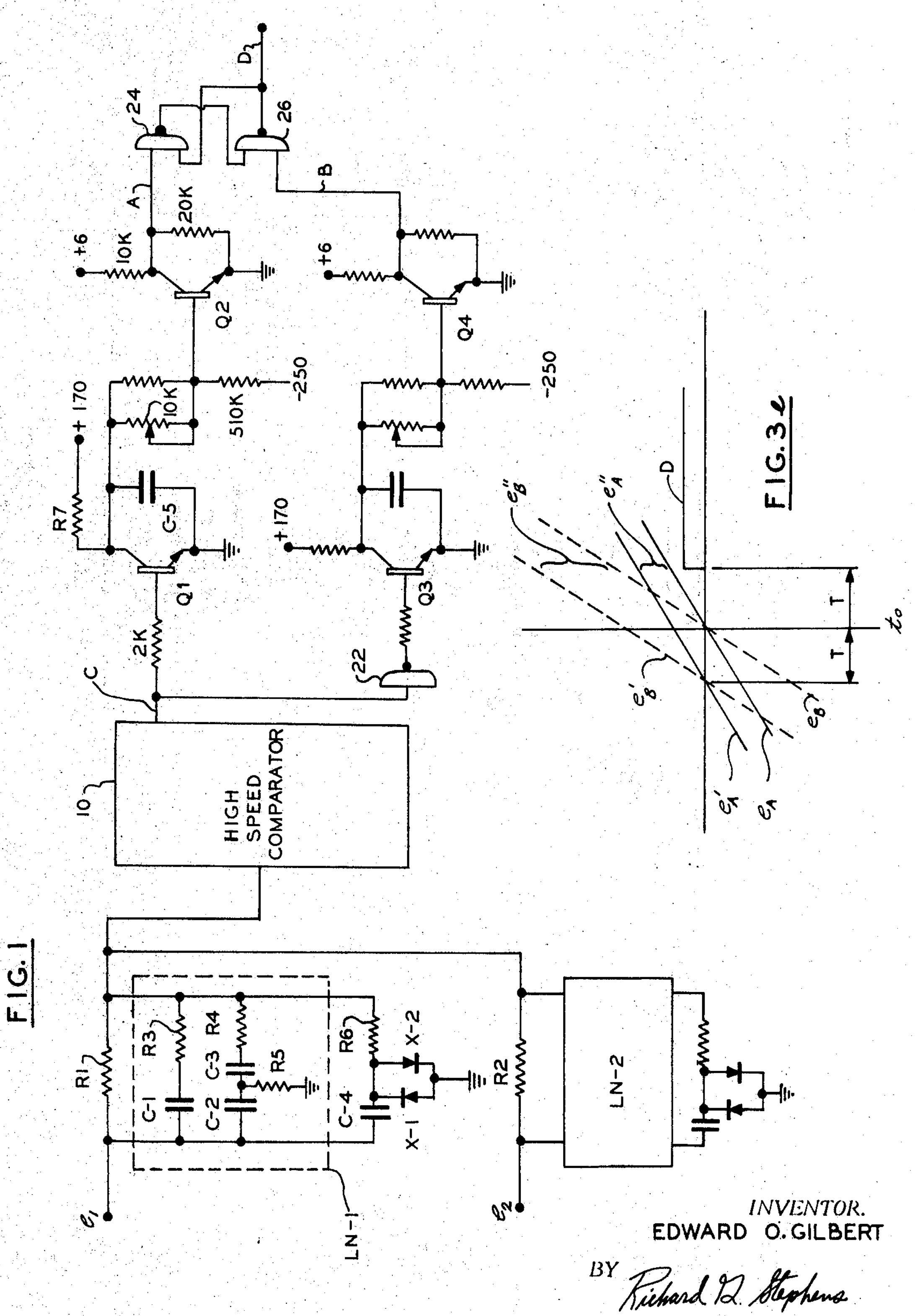
FIG. 1 is an electrical schematic diagram of one form of comparator circuit constructed in accordance with the invention.

In FIG. 3*e*, the output D of a comparator assumed to have delay circuits and logic of the type shown in FIG. 2 is shown changing T seconds after time $t_o$, the time at which a resultant input signal $e_A$ to the comparator changes sign. If signal $e'_A$ were instead applied to the comparator, it will be seen that the logic signal D would change exactly at $t_o$, since the sign of the $e'_A$ signal changes T seconds before time $t_o$. Similarly, while input signal $e_B$ causes an output signal with T seconds delay after it changes sign, application of input signal $e'_B$ in lieu of $e_B$ would evidently cause the output signal to change state exactly at time $t_o$. It will be seen that input signal $e_A$, may be converted to input signal $e'_A$ by addition to it of magnitude $e''_A$, and that input signal $E_B$ may be converted to input signal $e'_B$ by addition of magnitude $e''_B$. By comparison of magnitudes $e''_A$ and $e''_B$ with $e_A$ and $e_B$ it will become apparent that each required magnitude increment is proportional to the time rate of change or slope of its associated input signal, and hence that the undesirable time lag T inserted by delay circuits 12 and 14 may be eliminated by augmenting each input signal in accordance with its time rate of change. In accordance with a further feature of the invention, each input signal applied to the improved comparator-logic circuit may be augmented by paralleling its input resistor (e.g. R1, R2) with an RC lead network, as is illustrated by lead networks LN-1 and LN-2 shown in block form in FIG. 2. The deliberate use of a lead network in the input circuit will be seen to be in direct contrast to ordinary analogue signal-processing techniques wherein noise spikes are of concern, since in most analogue signal applications, the use of lead circuits, which time-differentiate input signals, operate to increase or emphasize noise spikes.

Both of the input circuits to the comparator are identical, and only one such circuit is shown in FIG. 1 in complete detail. In the specific circuit of FIG. 1, input resistor R1 is shown connected in parallel with the series combination of capacitor C-1 and resistor R3, which form a basic first-order lead network of well-known characteristics. A further RC circuit (C-2, C-3, R4 and R5) also may be connected in parallel, as will be explained below. Neglecting the further RC circuit for the moment, the value of capacitor C-1 may be chosen relative to the value of input resistor R1 so that the RC time constant of R1 and C1 equals the delay period T of each of unidirectional delay circuits 12 and 14. The impedance of the input circuit (R1, C-1 and R3) then will be seen to vary from that of R1 at zero frequency down to a lesser value (of substantially R3) at and above frequencies where the reactance of C-1 becomes small compared to the resistance of R3. The decrease in input circuit impedance with increase in input signal frequency, or rate of change, will be seen to result in augmenting of the input currents to the comparator in the desired manner explained above in connection with FIG. 3*e*, thereby decreasing the time-lag T caused by use of delay circuits 12 and 14. The further RC circuit which includes C-2, C-3, R4 and R5 provides a better approximation of a pure time lead out to a higher frequency.

High speed comparator 10 preferably comprises a high speed comparator of the type shown in my prior patent, and nonlinear lead networks are provided, as described in the patent, to compensate for delay in the comparator itself. Each nonlinear lead circuit is shown as comprising a capacitor and resistor (e.g. C-4 and R6), and a pair of oppositely-poled diodes X-1, X-2. Various other high speed comparators of known type may be used as comparator 10. The C output signal from comparator 10 is shown applied to NOR gate 22, which may comprise any one of a number of conventional NOR gates, and which operates in FIG. 1 as a simple logic inverter. The circuit of transistors Q1 and Q2 provides the function of unidirectional delay circuit 12 of FIG. 2, and the circuit of transistors Q3 and Q4 provides the function of unidirectional delay circuit 14. Transistor Q1 acts as a switching means to control the charging and discharging of capacitor C-5 of the RC circuit comprising C-5 and R7. In the specific circuit of FIG. 1, a logic O signal is represented by a +5 volt signal on line C, while a logic 1 signal results in a zero volt signal on line C. With a logic 0 plus 5 volt signal applied to the base of NPN transistor Q1, the transistor is turned on, shorting the collector to ground, and thereby applying a negative voltage to the base of Q2, cutting off Q2 so that its collector voltage on line A lies at approximately +4 or +5 volts, which provides a logic 0 signal on line A. Upon the occurrence of a zero-volt logic 1 signal pulse on line C, transistor Q1 will be immediately cut off, and the collector of Q1 will begin to rise exponentially toward a voltage of approximately +100 volts as capacitor C-5 charges through resistor R7. When and if the Q1 collector reaches approximately +5 volts, however, Q2 will be turned on, thereby dropping the Q2 collector voltage to provide a logic 1 signal on line A. If the duration of the logic 1 signal on line C is very small, however, as ordinarily would result from a noise spike, the Q1 collector will not rise sufficiently to turn on Q2, but a longer duration logic 1 signal will be seen to insure turn on of transistor Q2. Thus transistor Q2 acts as a comparison means which measures the level of the C-5 charge with respect to ground and provides an output logic signal A to NOR gate 24. With a long-duration logic 1 signal on line C, the Q1 collector eventually rises to a voltage of approximately +15 volts. Turn on of transistor Q2 is dependent, however, only upon a rise of the Q1 collector from zero to approximately +5 volts, and hence it will be seen that Q2 turn on is governed by the initial, substantially-linear portion of the capacitor C-5 charging characteristic. Irrespective of whether a logic 1 signal on line C is very brief, so that C-5 does not become sufficiently charged to turn on Q2, or of substantial duration, so that Q2 is turned on, it will be seen that reset of the signal on line C to a logic 0 level will result in immediate turn on of Q1, shorting of capacitor C-5, and immediate cutoff of transistor Q2. Thus it will be seen that the circuit of transistors Q1 and Q2 provides a logic 1 output signal on line A if and only if a logic 1 signal on line C persists for a predetermined length of time, and provides a logic 0 signal on line A immediately upon reset of the line C signal to logic 0. Transistors Q3 and Q4 operate in identical manner in response to the inverted $\overline{C}$ signal from inverter 22, to provide output signals on line B. The output signals on lines A and B from the two unidirectional delay circuits are applied to respective input lines of two NOR gates 24 and 26, which are cross-coupled as shown to operate as a set-clear flip-flop in well-known manner. Thus the apparatus of FIG. 1 will be recognized to operate in the manner explained above in connection with FIGS. 2 and 3*a* to 3*e*.

In one successful embodiment of the invention the following component values were utilized:

| | | | |
|---|---|---|---|
| C-1 | 62 pf. | R1, R2, R7 | 100K |
| C-2 | 500 pf. | R3 | 470K |
| C-3 | 130 pf. | R4 | 100K |
| C-4 | 15 pf. | R5 | 15K |
| C-5 | .001 mfd. | R6 | 560K |

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

I claim:

1. A noise-rejecting electronic analogue comparator system adapted to provide an output logic signal which swings without appreciable time delay from one to the other of two levels whenever the sum of applied input signals changes sign, but adapted not to respond to signals having less than a predetermined time duration, comprising, in combination: an electronic comparator having input circuit means connected to receive said input signals and to provide first and second mutually opposite logic signals which swing substantially immediately from one state to an opposite state upon a change in the sign of said sum of said input signals; first and second unidirectional delay circuit means, each responsive to a respective one of said first and second logic signals, each operative to provide a respective output logic signal transition in one direction substantially immediately upon transition of its respective logic input signal from one state to a second state, and each operative to provide a respective output logic signal transition in an opposite direction only after its respective input logic signal has remained in its first state for a predetermined time period; and bistable circuit means having a pair of mutually oppositely-effective input lines connected to receive the output signals from said first and second delay circuit means and to provide said output logic signal, said input circuit means of said electronic comparator having a lead time-constant commensurate with said predetermined time period.

2. A system according to claim 1 in which said input circuit means comprises a first resistance connected to apply an input signal to said comparator, and a second resistance and a capacitor connected in series across said first resistance.

3. A system according to claim 1 in which said input circuit means comprises a first resistance connected to apply an input signal to said comparator, a second resistance and a capacitance connected in series across said first resistance, and a third resistance and a further capacitance connected in series across said first resistance.

4. A system according to claim 1 in which said input circuit means comprises a first resistance connected to apply an input signal to said comparator, and a plurality of resistance-capacitance circuit branches connected in parallel with said first resistance, each of said circuit branches including a resistance and a capacitance connected in series with each other.

5. A system according to claim 1 in which at least one of said delay circuit means comprises a resistance-capacitance circuit having a first terminal, switching means, and comparison means, said comparison means being connected to said first-terminal and operable to provide an output logic signal in accordance with the sign of the potential at said first terminal relative to a reference level, and said switching means being controlled by the logic input signal to said one of said delay circuit means and operative to control charging and discharging of said resistance-capacitance circuit.

6. A system in accordance with claim 5 in which said resistance-capacitance circuit comprises a resistance and a capacitance connected in series across a source of fixed potential and in which said switching means is connected in parallel with said capacitance.